United States Patent [19]

Walker et al.

[11] 4,191,957

[45] Mar. 4, 1980

[54] METHOD OF PROCESSING RADAR DATA FROM A ROTATING SCENE USING A POLAR RECORDING FORMAT

[75] Inventors: Jack L. Walker; Walter G. Carrara, both of Ann Arbor, Mich.

[73] Assignee: Environmental Research Institute of Michigan, Ann Arbor, Mich.

[21] Appl. No.: 640,570

[22] Filed: Dec. 12, 1975

[51] Int. Cl.² .............................................. G01S 9/02
[52] U.S. Cl. ............................... 343/5 PC; 343/9 PS; 324/77 K
[58] Field of Search ........................... 343/5 PC, 9 PS; 324/77 K

[56] References Cited

U.S. PATENT DOCUMENTS

| | | | |
|---|---|---|---|
| 2,798,116 | 7/1957 | Wiens | 343/5 PC |
| 3,143,732 | 8/1964 | Leighton et al. | 343/5 PC |
| 3,398,269 | 8/1968 | Williams | 324/77 K X |
| 3,519,331 | 7/1970 | Cutrona et al. | 343/9 X |
| 3,612,658 | 10/1971 | Slaymaker | 350/162 SF |
| 3,883,803 | 5/1975 | Donald et al. | 324/77 K |
| 3,903,407 | 9/1975 | Burnham | 324/77 K X |
| 3,905,031 | 9/1975 | McCord | 343/5 PC X |

Primary Examiner—Malcolm F. Hubler
Attorney, Agent, or Firm—Krass & Young

[57] ABSTRACT

A method for range-Doppler imaging of rotating objects or of stationary scenes being tracked by a sensor carried by a moving vehicle includes the transmission and reception of sequential modulated signals, coherent demodulation of the received signals, recording of the demodulated signals, and a two-dimensional processing of the recorded signals to obtain a spatial image of the scene. In the disclosed inventive concept, the demodulated signals are recorded in a two-dimensional polar format wherein the angular coordinate of the signal on the recording medium is proportional to the relative angular position of the object or scene being imaged and the radial coordinate of the signal on the recording medium is proportional to the transmitted signal frequency within each transmitted pulse.

13 Claims, 9 Drawing Figures

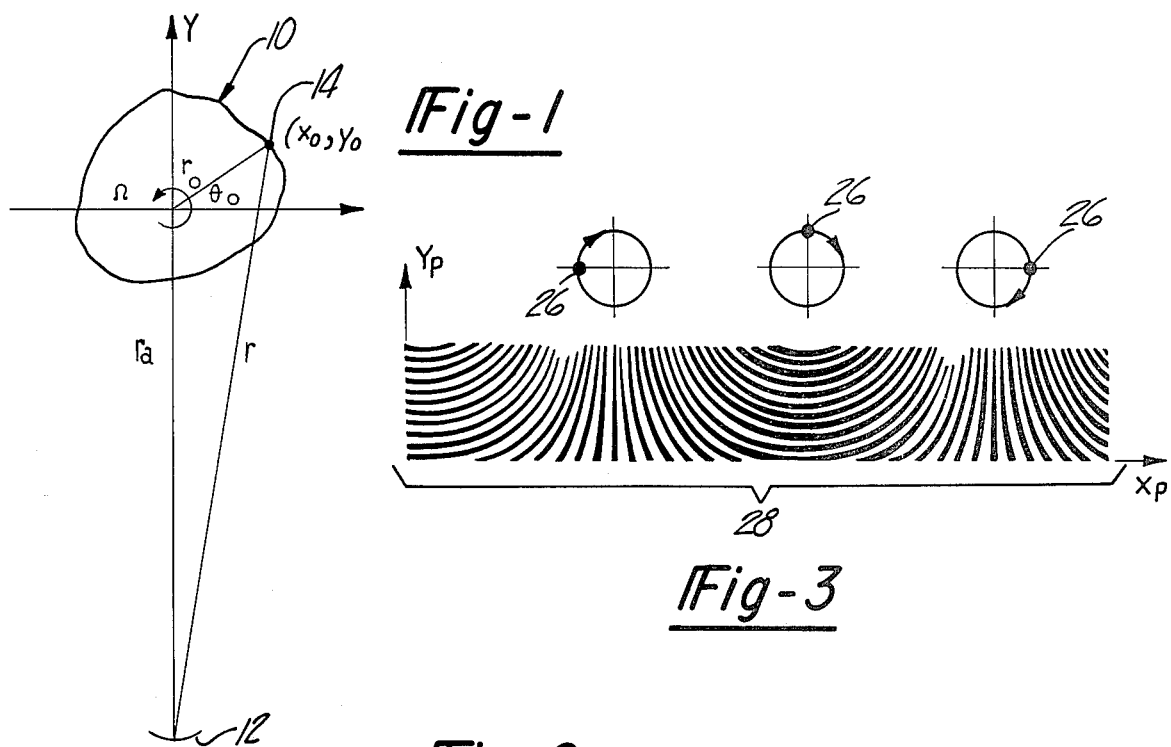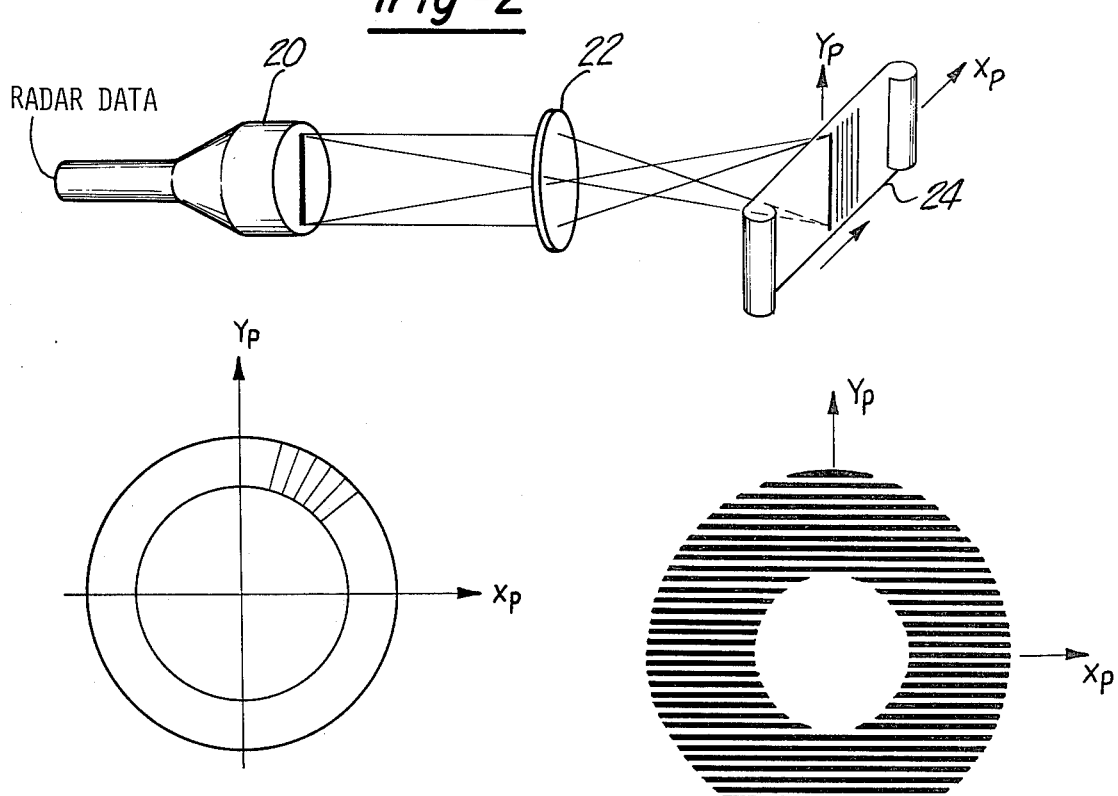

RADAR DATA

METHOD OF PROCESSING RADAR DATA FROM A ROTATING SCENE USING A POLAR RECORDING FORMAT

BACKGROUND OF THE INVENTION

The basic task of a range-Doppler imaging system is to estimate the relative reflectivity of a spatial distribution of scatterers. The range-Doppler principle implies that an appropriate signal is radiated and the return signal is processed in order to determine the range (time-delay) and radial velocity (Doppler frequency) of each scattering element of an object. In particular, the presence of a radial velocity gradient across a rigid, rotating object allows one to obtain an image by associating a time delay and Doppler frequency with each point on the object. This technique is more fully discussed in all of the following references: Evans, J. V. and T. Hagfors, Eds., *Radar Astronomy*, New York, McGraw-Hill (1968); Green, P. E. and R. Price, "Signal Processing in Radar Astronomy", *Lincoln Lab. Tech. Rpt.*, No. 234, October 1960; Leith, E. N., "Quasi-Holographic Techniques in the Microwave Region", *Proc. IEEE*, Vol. 59, p. 1305, September 1971; and Brown, W. M. and L. J. Porcello, "An Introduction to Synthetic Aperture Radar", *IEEE Spectrum*, Vol. 6, p. 52, September 1969.

In range-Doppler imaging, fine range resolution is obtained by transmitting a signal that has a wide frequency band width. Doppler frequency resolution, and hence crossrange resolution, is inversely proportional to the coherent integration time interval.

In the usual analysis of range-Doppler imaging, the distance and relative motion between a point scatterer and the radar antenna is assumed to modify the received signal by a constant unknown time delay and Doppler frequency, respectively. However, more elaborate interactions between the object and transmitted signal occur if the coherent integration time is longer than the time required for object points to move through resolution cells, as is documented in Brown, W. M., "Synthetic Aperture Radar", *IEEE Trans. on AES*, Vol. 3, p. 217 (1967). Consequently, a simple time delay measurement and Doppler frequency analysis (Fourier transform) type of signal processing will result in degraded imagery if there is motion through resolution cells during an integration time interval.

As explained in Brown, W. M. and R. J. Fredericks, "Range-Doppler Imaging with Motion Through Resolution Cells", *IEEE Trans. on AES*, Vol. 5, p. 98 (1969), the problem of motion through resolution cells imposes the following resolution limitations:

$$\rho_a^2 > \lambda D_r/4$$

$$\rho_a \rho_r > \lambda D_a/4$$

where: $\rho_a$ is crossrange resolution, $\rho_r$ is range resolution, $D_r$ is object width in range, and $D_a$ is object width in crossrange.

As a first approximation, the image aberrations which account for these resolution limitations are crossrange-dependent astigmatism and range-dependent crossrange focus error, also known in the art as "range walk" and "variable range rate", respectively.

To avoid these resolution limitations it is necessary to compensate for the changing range and Doppler frequency associated with each object point as it moves with time along its circular trajectory in the range-Doppler plane.

When the range-Doppler imaging is done with coherent optical data processing techniques, such as of the type disclosed in Cutrona, et al, U.S. Pat. No. 3,519,331, the prior art has approached the problem of resolution limitation with optical compensation techniques, e.g., as discussed in Brown, W. M. and R. J. Fredericks, "Range-Doppler Imaging with Motion Through Resolution Cells", *IEEE Trans. on AES*, Vol. 5, p. 98 (1969) and Fredericks, R. M., *Space Variant Filtering In Coherent Optical Data Processors*, Ph. D. Dissertation, University of Michigan, 1970. These optical techniques provide only a partial compensation for the rotational motion of object points through resolution cells, require a less desirable frame-by-frame approach to data processing, and are difficult to implement.

Another prior art optical compensation technique involves sectional processing in which lens adjustments are made in the optical processor to compensate for range-dependent crossrange focus error and for crossrange-dependent astigmatism error in one section of the scene. But a different adjustment is required to optimize the resolution of each section of the scene. The final image produced by photographically summing individually processed sections is only partially compensated and contains much image distortion.

Thus it is an object of the present invention to provide a technique for improving the resolution of a range-Doppler imaging system that provides compensation for motion through resolution cells in a convenient and effective manner, without the disadvantages of prior art techniques.

SUMMARY OF THE INVENTION

The present invention introduces the step of recording coherently demodulated radar signal data in a two-dimensional polar format preparatory to the spatial imaging of the rotating object or scene. The polar format approach enhances resolution in both range and crossrange directions. The rotating object or scene may be spatially imaged over relatively large angular intervals which enhances the ability to determine the size and shape of the specular object or scene.

In the preferred form of the invention this is accomplished by recording the coherently demodulated radar signal data on an optically transmissive recording medium in a two-dimensional polar format. At every point on the recording medium the transmissivity is proportional to the instantaneous value of the demodulated radar signal wherein the angular coordinate of the signal on the recording medium is proportional to the relative angular position of the object or scene being imaged and the radial coordinate of the signal on the recording medium is proportional to the transmitted signal frequency within each transmitted pulse. Particularly, this may be implemented by intensity modulating and imaging the line scan of a cathode ray tube onto a disk of photographic film which rotates in timed relation to the rotation rate of the object or scene. The spatial image may be obtained by coherent optical processing with a single spherical lens.

Since the inventive concept is more general than the embodiment described above, the invention is adaptable for use with alternative recording media; both analog and digital.

Similarly, while the embodiment described above is associated with radar signals, the inventive concept is adaptable for use with various other wave phenomena including sonic and ultrasonic signals.

Similarly, the inventive concept is adaptable not only to imaging rotating objects but also to imaging stationary scenes with apparent rotary motion caused by a sensor traveling past and tracking the scene.

Further additions, modifications, and advantages of the invention will be made apparent in the following detailed description.

BRIEF DESCRIPTION OF THE DRAWINGS

FIG. 1 is a two-dimensional, schematic view of a rotating object spaced a distance from a radar antenna;

FIG. 2 is a schematic illustration of a prior art technique for recording radar data onto a recording film;

FIG. 3 is the film record of the signal from a single point scatter recorded in accordance with the technique illustrated in FIG. 2;

FIG. 4 is a schematic illustration of a two-dimensional polar format recording;

FIG. 6 is the two-dimensional polar formatted counterpart of the signal of FIG. 3;

DETAILED DESCRIPTION OF THE SPECIFIC EMBODIMENT

Figure 5:
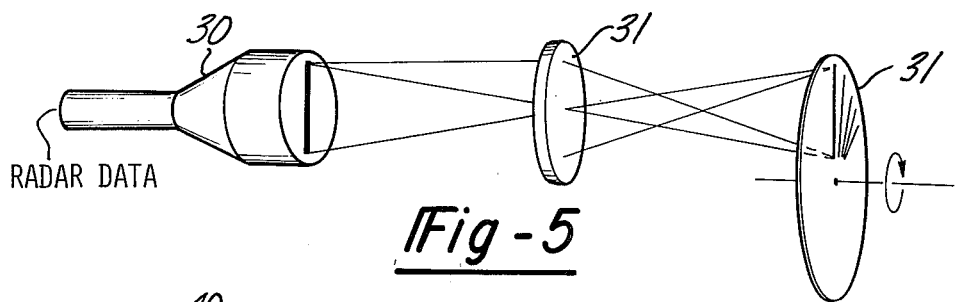
FIG. 5 is a schematic illustration of the apparatus used to accomplish a two-dimensional polar format recording.

As a background for an understanding of the improvement that the present invention provides in connection with a range-Doppler (or what is sometimes referred to as synthetic aperture radar [SAR]) imaging system, an identification of the errors inherent in prior art methods is helpful.

FIG. 1 illustrates in two dimensions the example of a rotating object to being illuminated by a radar antenna 12. If the initial location of a point scatterer 14 on rotating object 10 is $(x_o, y_o)$ then at time t the distance r from a distant $(r_a^2 >> x_o^2 + y_o^2)$ radar antenna 12 to point 14 is approximately $$r = r_a + x_o \sin \Omega t + y_o \cos \Omega t \quad [1]$$

where $\Omega$ is the rotation rate. Similarly, the Doppler frequency $f_d$ of the return radar signal is $$f_d = 2/\lambda (dr/dt) = (2x_o\Omega/\lambda) \cos \Omega t - (2y_o\Omega/\lambda) \sin \Omega t \quad [2]$$

where $\lambda$ is the radar wavelength.

If the radar data are processed over a very small time interval, Equations [1] and [2] can, respectively, be approximated as $$r = r_a + y_o \quad [3]$$

$$f_d = 2x_o\Omega/\lambda \quad [4]$$

Therefore, by analyzing the return radar signal in terms of range delay and Doppler frequency, the position of point scatterer 14 can be estimated. This constitutes the usual range-Doppler imaging procedure.

However, the presence of the object rotation rate, $\Omega$, in Equation [4] implies that in order to obtain a properly scaled image of object 10, the magnitude of $\Omega$ must be known. Most techniques for estimating the rotation rate depend on a priori knowledge and on analysis of periodicities in the radar signal band. Another implicit assumption here is that the distance $r_a$ from radar antenna 12 to the center of object 10 is constant and known. In applications where $r_a$ is a function of time, the effects of time-varying gross range and range rate must be removed in the radar receiver and/or processor.

As shown in Leith, E. N., "Quasi-Holographic Techniques in the Microwave Region", Proc. IEEE, Vol. 59, p. 1305, September 1971, for example, the resolution $\rho_a$ in the crossrange dimension is approximately $$\rho_a = \lambda/2\Delta\theta \quad [5]$$

where $\Delta\theta = \Omega T_p$ is the angle through which the object rotates during a coherent processing time $T_p$. Fine crossrange resolution implies coherent processing over a large $\Delta\theta$; however, Equations [1] and [2] indicate that both the range and Doppler frequency of point scatterer 14 can vary greatly over a large processing interval. This means that during a processing time interval sufficiently long to give the desired crossrange resolution, points on rotating object 10 may move through several resolution cells. Therefore, the usual range-delay measurement and Doppler frequency analysis implied by Equations [3] and [4] will result in degraded imagery for the large processing interval case.

To examine this problem in more detail, the case of a linear FM (chirp pulse) radar is assumed. That is, the radar transmits a sequence of pulses of the form $$P_n(t) = a(t - nT) \exp\{j \, 2\pi[f_c t + (\gamma/2)(t-nT)^2]\} \quad [6]$$

where a(t) is the amplitude weighting of each pulse, $\gamma$ is the FM rate, 1/T is the pulse repetition frequency, and fc is the carrier frequency.

Denoting the complex reflectivity density of object 10 by $\sigma(x_o, y_o)$, the signal received from a differential element of area $dx_o\, dy_o$ is $$\sigma_r(x_o, y_o) P_n(t - \frac{2r}{c}) dx_o dy_o \quad [7]$$

where antenna gain and two-way propogation effects have also been included in $\sigma_r$. The received signal is demodulated by mixing it with a reference signal of the form $$\exp\left\{ -j\, 2\pi \left[ f_c\left(t - \frac{2r_a}{c}\right) + \frac{\gamma}{2}\left(t - nT - \frac{2r_a}{c}\right)^2 \right] \right\} \quad [8]$$

which is a replica of the transmitted signal delayed by $2(r_a/c)$. The n-tn pulse of the resulting video signal corresponding to the differential element of reflectivity is approximately $$dS_n(t) = [\sigma_r(x_o, y_o)dx_o dy_o]\, a(\hat{t})\, \exp\left\{ j\, 2\pi \left[ \frac{2}{\lambda} + \frac{2\gamma \hat{t}}{c} \right] \hat{r} \right\} \quad [9]$$

where:

$$\lambda = \frac{c}{f_c}$$

-continued $$\hat{t} = t - nT - \frac{2r_a}{c}$$

$$\hat{r} = r - r_a = x_o \sin\Omega t + y_o \cos\Omega t$$

In obtaining Equation [9], constant phase terms have been omitted and the length of the transmitted pulse is assumed to be long compared to 2r/c. Integrating $dS_n(t)$ over the entire area of object 10 results in an expression for the total video pulse $$S_n(t) = \int\int \sigma_r(x_o, y_o) a(t) \exp\left\{j 2\pi \left[\frac{2}{\lambda} + \frac{2\gamma t}{c}\right]\right. \quad [10]$$

$$\left. (x_o \sin\Omega t + y_o \cos\Omega t)\right\} dx_o dy_o$$

By appropriate processing the video signal, an estimate of $\sigma_r(x_o, y_o)$ can be obtained.

FIG. 2 illustrates a prior art technique for optically implementing a range-Doppler processing system. The video signal in the form expressed in Equation [10] above is input to a cathode ray tube (CRT) 20. The CRT 20 outputs a line scan with a sweep repetition period T. The line scan is intensity modulated in accordance with the video signal of Equation [10] and the trace of the line scan is imaged by a lens 22 onto a strip of translating film 24. Each sweep of CRT 20 corresponds to one video pulse.

This type of recording format implies that the range and crossrange film coordinates ($y_p$ and $x_p$) are given by $$y_p = v_s \hat{t} \quad [11]$$
$$x_p = v_F t$$

where $V_s$ is the sweep velocity of CRT 20 and $V_f$ is the translational velocity of film 24.

Therefore the recorded spatial signal is $$S_r(x_p, y_p) = A_y(y_p) \int\int \sigma_r(x_o, y_o) \exp\left\{j 2\pi \left[\frac{2}{\lambda} + \frac{2\gamma y_p}{cv_s}\right]\right. \quad [12]$$

$$\left. \left[x_o \sin\left(\frac{\Omega x_p}{v_F}\right) + y_o \cos\left(\frac{\Omega x_p}{v_F}\right)\right]\right\} dx_o dy_o$$

where $A_y(y_p)$ is the amplitude weighting corresponding to a(t) and where the usual film bias term and complex conjugate term which would be present in a real recorded signal have been ignored.

At this point, the usual approach is to consider small data processing intervals centered about $x_p = y_p = 0$. One can then use the approximations $$\sin\left(\frac{\Omega x_p}{v_F}\right) \approx \frac{\Omega x_p}{v_F}$$

$$\cos\left(\frac{\Omega x_p}{v_F}\right) \approx 1 - \frac{1}{2}\left(\frac{\Omega x_p}{v_F}\right)^2 \quad [13]$$

With these approximations the recorded signal can be expressed as $$S_r(x_p, y_p) \approx \quad [14]$$

$$A_y(y_p)\int\int \tilde{\sigma}_r(x_o, y_o) \exp j2\pi \left\{\frac{2\gamma}{cv_s} y_p y_o + \frac{2\Omega}{\lambda v_F} x_p x_o + \right.$$

$$\left. \frac{2\gamma\Omega}{cv_s v_F} x_o x_p y_p - \frac{1}{\lambda}\left(\frac{\Omega}{v_F}\right)^2 y_o x_p^2 - \left(\frac{\Omega}{v_F}\right)^2 \frac{\gamma}{cv_s} y_o y_p x_p^2\right\} \cdot dx_o dy_o$$

where $\tilde{\sigma}_r(x_o, y_o) = \sigma_r(x_o, y_o) \exp\left\{j\frac{4\pi}{\lambda} y_o\right\}$ If the last three phase terms of the integral are ignored, the recorded signal $S_r(x_p, y_p)$ is approximately the two-dimensional Fourier transform of the reflectivity $\tilde{\sigma}_r(x_o, y_o)$. Therefore, an image of the object can be obtained by performing an inverse two-dimensional Fourier transform of $S_r(x_p, y_p)$. Since a spherical lens produces an approximate two-dimensional Fourier transform relationship between the complex amplitude of the light distribution in its front and back focal planes, as taught by Cutrona, et al, U.S. Pat. No. 3,519,331, the required signal processing operation can be conveniently carried out optically.

The x and y scale factors are $2\Omega/\lambda v_f$ and $2\gamma/c\Omega$, respectively. An image with a one-to-one aspect ratio is obtained if the film speed $V_f$ and CRT sweep speed $V_s$ are chosen such that $$v_s/v_F = \gamma\lambda/c\Omega \quad [15]$$

Of the three aberration terms that were ignored in Equation [14] the two most significant are $$\Phi_1 = (4\pi\gamma\Omega/cv_s v_F) x_o x_p y_p \quad [16]$$

and $$\Phi_2 = 2\pi/\lambda(\Omega/v_F)^2 y_o x_p^2 \quad [17]$$

The first, $\Phi_1$, is a crossrange-dependent astigmatism term and the second, $\Phi_2$, is a range-dependent crossrange focus error. In the past, the effects caused by $\Phi_1$ and $\Phi_2$ have been called "range walk" and "variable range rate", respectively.

The usual criterion, as described in Klauder, J. R., A. C. Price, S. Darlington, and W. J. Albersheim, "The Theory and Design of Chirp Radar", *The Bell Systems Technical Journal*, Vol. 39, No. 4, p. 745, July 1960, for ignoring a quadratic phase error is to require that the change in phase over a processing aperture be less than $\pi/2$. If the processing aperture dimensions are $\Delta x_p$ by $\Delta y_p$, this criterion implies that $$\Delta\Phi_1 = \frac{\pi\gamma\Omega D_a}{2cv_s v_F} \Delta x_p \Delta y_p < \frac{\pi}{2} \quad [18]$$

where $D_a$ is the maximum crossrange dimension of the object.

The crossrange resolution $\rho_a$ is $$\rho_a \approx \lambda/2\Delta\theta = \lambda v_F/2\Omega\Delta x_p \quad [19]$$

where $\Delta\theta$ is the change in object aspect angle (i.e., $\Delta\theta = \Omega\Delta X_p/V_F$) and the range resolution $\rho_r$ is $$\rho_r \approx c/2B = cv_s/2\gamma\Delta y_p \quad [20]$$

where B is the amount of transmitter bandwidth utilized in a processing interval of $\Delta y_p$. Therefore Inequality [18] implies that $$\rho_a \rho_r > \lambda D_a/4 \qquad [21]$$

Similarly, $\Phi_2$ can be ignored if $$\Delta \Phi_2 = \frac{\pi}{4\lambda} \left(\frac{\Omega}{v_F}\right)^2 D_r \Delta x_p^2 < \frac{\pi}{2} \qquad [22]$$

where $D_r$ is the object width in range. Inequality [22] implies that the crossrange resolution is limited by $$\rho_a^2 > \lambda D_r/4 \qquad [23]$$

The expression for the recorded signal (Equation [12] above) implies that lines of constant phase are given by $$(a + by_p)\left[x_o \sin\left(\frac{\Omega x_p}{v_F}\right) + y_o \cos\left(\frac{\Omega x_p}{v_F}\right)\right] = n2\pi \qquad [24]$$

where: $a = 4\pi/\lambda$, $b = 4\pi\gamma/cv_s$, and n is a nonnegative integer. Equation [24] may be rewritten as $$a + by_p = \frac{n2\pi}{r_o} \sec\left[\frac{\Omega x_p}{v_F} - \arctan\left(\frac{x_o}{y_o}\right)\right] \qquad [25]$$

where $r_o = (x_o^2 + y_o^2)^{\frac{1}{2}}$. Thus, as illustrated in FIG. 3, the collection of constant phase lines resulting from a point scatterer 26 moving in a circle is a section from a family of secant functions. The three diagrams above the recorded signal 28 indicate three discrete positions of point scatterer 26 as it moves along its circular path.

Over a small aperture, the modulation of recorded signal 28 approximates a linear diffraction grating and a Fourier transform constitutes adequate signal processing. However, the curvature of the lines limits the maximum useful aperture and, consequently, limits the resolution which can be achieved by simple Fourier transform. This is a physical manifestation of the limitations imposed by Inequalities [21] and [22] above.

An approach for processing rotating object radar data without the limitations known to the prior art, can be derived by an analysis of the form of the video signal $$S_n(t) = \int\int \sigma_r(x_o, y_o) a(\hat{t}) \exp\left\{j 2\pi \left[\frac{2}{\lambda} + \frac{2\gamma \hat{t}}{c}\right]\right. \qquad [10]$$
$$\left. (x_o \sin\Omega t + y_o \cos\Omega t)\right\} dx_o dy_o$$

This signal can be recorded such that the resulting spatial signal is in the form of a two-dimensional Fourier transform if the radial film coordinate $r_p$ and the relative film angle are chosen to be $$r_p = v_s(\hat{t} + \frac{c}{\gamma\lambda}) \qquad [29]$$

-continued
$$\theta_p = \frac{\pi}{2} - \Omega t$$

These transformations imply that the video signal can be stored on a recording medium in a polar format as illustrated in FIG. 4. This may be accomplished, as illustrated in FIG. 5, by allowing the video signal to intensity modulate a line scan CRT 30 whose output is imaged with a lens 31 onto a photographic film 32 which is rotated with an angular velocity equal to the rotation rate $\Omega$ of the object.

The recorded signal then becomes $$S_p(r_p, \theta_p) = \qquad [30]$$
$$A(r_p) \int\int \sigma_p(r_o, \theta_o) \exp\left[j\frac{4\pi\gamma}{cv_s} r_p r_o \cos(\theta_p - \theta_o) r_o dr_o d\theta_o\right]$$

where $r_o$, $\theta_o$ are the polar coordinates of an object point, $A(r_p)$ is an amplitude weighting function that is zero outside the annular region shown in FIG. 4, and where $\sigma_p(r_o, \theta_o) = \sigma_r(x_o, y_o)$. Since $Sp(r_p, \theta_p)$ is the two-dimensional Fourier transform of the object reflectivity density $\sigma_p(r_o, \theta_o)$, an appropriate optical processor would consist basically of a single spherical lens.

The lines of constant phase for $S_p(r_p, \theta_p)$ are given by $$\frac{4\pi\gamma}{cv_s}[r_p r_o \cos(\theta_p - \theta_o)] = \frac{4\pi\gamma}{cv_s}[x_p x_o + y_p y_o] = n2\pi \qquad [31]$$

They form a family of equally spaced straight lines; i.e. a linear diffraction grating as shown in FIG. 6. The spatial frequency and orientation of the grating depends on the radial coordinate, $r_o$ of the object point and on $\theta_o$, respectively. The total recorded signal for a complex rotating object consists of a coherent summation of a multiplicity of such gratings, each with a different orientation and frequency. A comparison of FIGS. 3 and 6 indicates that diffraction limited imagery can be obtained by Fourier transformation over a much larger aperture if a polar storage format is used.

In principle, one could also process the rectangular format data shown in FIG. 3 over large apertures by using an appropriate matched filter. However, a different matched filter would be necessary for each point $(x_o, y_o)$ on the object to be imaged, i.e., a space-variant processor would be required. By using a polar storage format, the required signal processing is converted to another, but more suitable, type of space variant operation—a two-dimensional Fourier transform.

Figure 7:
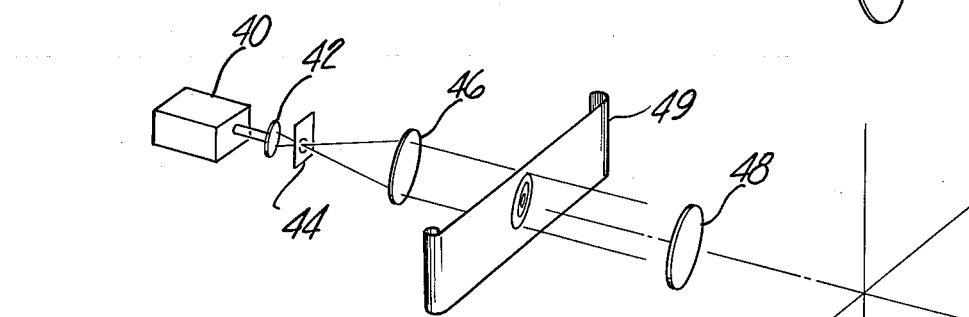
FIG. 7 is a schematic illustration of coherent optical processing apparatus.

An optical processor suitable for use with the polar format recording method is illustrated in FIG. 7. It includes a laser 40 which provides a coherent light source, a beam expander 42, a pin hole filter 44, a collimating lens 46, and a Fourier transform lens 48. The image from the polar format data film 49 can be observed with a microscope at the image plane 52, or a camera can be used to make a permanent film recording.

By using apertures of various sizes and shapes at the input data film plane, imagery with a variety of range and crossrange resolutions can be obtained. Since the radial interval of the polar format recording is proportional to the transmitted band width, the fraction of the actual transmitted bandwidths used in the optical processor can be controlled by choosing the size of the radial interval of the processing aperture. Similarly, radar data can be processed over different angular intervals of object rotation by using an aperture that encompasses a corresponding angular interval of the polar format recording.

Normally, when processing radar data from a rotating object over small angular intervals of rotation $\Delta\theta$, range resolution (measured along radar line-of-sight) is inversely proportional to the transmitted signal bandwidth, whereas crossrange resolution varies inversely with $\Delta\theta$. However, for large $\Delta\theta$, resolution in both dimensions of the rotating object improves with increasing $\Delta\theta$. The ability to determine the size and shape of a specular object is greatly enhanced by processing the recorded data over large angular intervals. The resulting image then contains reflectivity information about the object over a wide range of aspect angles. One way to perform processing over wide aspect angles is to simply illuminate the full 360° of the polar format recording in the optical processor. Instead of coherently processing over the full annulus, one can also use a coherent processing aperture of a size sufficient to produce the desired resolution and then move the aperture around the entire 360° of the recording while continually exposing a piece of film at the image plane. The resulting image consists of a noncoherent summation of a large number of coherently processed images. This is often called "mixed" processing.

The analysis thus far has tacitly assumed that the angle between the radar transmitter line-of-sight (los) and the object axis-of-rotation, $\phi_a$, is 90°. As $\phi_a$ approaches 0°, i.e., when the transmitter los is parallel to the axis of rotation, the image will collapse to a point. It is apparent that the effects of a time varying angle $\phi_a$ must be compensated to avoid image quality degradation.

If $\phi_a$ is a time varying function it can be compensated for by modulating the radial coordinates $r_p$ of the polar format recording in accordance with the time varying $\phi_a$. In practice, this may be implemented in the film recording by causing the sweep speed to vary from pulse-to-pulse according to the sin-$\phi_a$ variations.

A possible application of range-Doppler imaging involves a sensor scanning and tracking a stationary scene. In this application the target field has a relative rotary motion with respect to the sensor; thus polar formatting of recorded data is advantageous.

As heretofore discussed, there are basically two requirements for achieving the proper polar format. First, the recording film must rotate in synchronism with the object (in this case the object being the target field). Second, the radial position of the writing beam must be the same function of time (within a multiplicative constant) as the instantaneous frequency of the transmitted signal. For example, if the transmitted signal is a series of chirp pulses, each of which starts at a high frequency and sweeps linearly to a lower frequency, the CRT writing beam must start at the outside of the recording material and move with a constant velocity toward the center.

Figure 8:
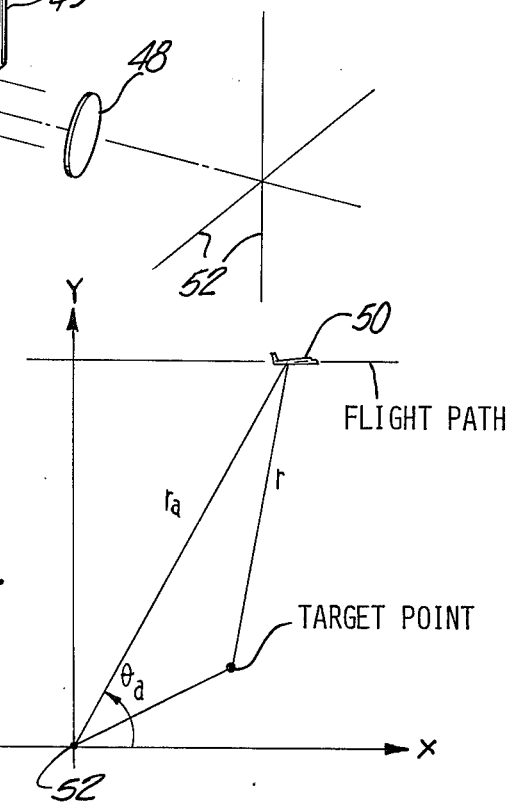
FIG. 8 is a two-dimensional, schematic illustration of an aircraft using spotlight mode radar for range-Doppler imaging of a target area.

As illustrated in FIG. 8, with spotlight mode operation the distance $r_a$ between the aircraft 50 and the center of the scene 52 varies with time. Consequently, it also is necessary to introduce a compensating CRT trigger delay $(2r_a/c)$. In practice the size of the recording disk is an important consideration. For the case of the spotlight mode operation with a CRT/film recorder, the space-bandwidth product is so great as to require a recording disk on the order of one meter. There is an alternative approach which will avoid the use of a large disk.

Figure 9:
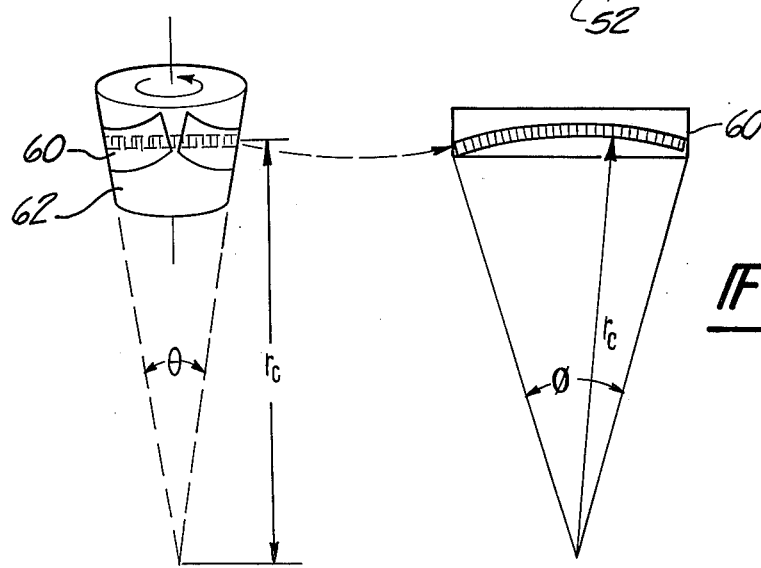
FIG. 9 is a conic film holder for use in connection with the radar application of FIG. 9.

Since it is not necessary to record a full 360° in the spotlight mode case, one way to avoid a large disk, as shown in FIG. 9, is to wrap a strip of film 60 around a conic section 62 which has an angle of convergence $\theta_c = 2 \arcsin(\phi/2\pi)$ and rotates at a rate $\Omega_c = 2\pi/\phi \cdot d\theta_a/dt$ where $\phi$ is the total angular recording interval and $\theta_a$ is shown in FIG. 8 as the angle between the target reference plane (ground) and the vector $r_a$ between the center of the scene 52 and aircraft 50. In a typical application, a 5 inches wide strip of film permits one to record spotlight data over an angle $\phi = 60°$.

The basic inventive concept is not limited to the embodiments shown herein. For instance, the invention is adaptable to analog data processing systems utilizing various electro-optical transducers and recording materials.

Moreover, the invention has potential for adaptation to digital data processing systems. In this case a matrix whose n x mth element corresponds to the recorded signal at the point with coordinates $(r_n, \theta_m)$ would be the counterpart of the optical recording medium. The Fourier transform operation performed on the optically recorded data by a spherical lens can be performed on the stored matrix data by readily available software routines.

Further variations to the embodiments heretofore set forth may suggest themselves to those having skill in the art without departing from the scope of the invention.

Having described our invention, we claim:

1. In a method of range-Doppler imaging a scene which is rotating about an axis of rotation relative to a sensor wherein return signal data are sequentially received, coherently demodulated, and recorded preparatory to spatial imaging of the scene, the improvement which comprises:

recording the return signal data on a recording medium in an ordered array with a two-dimensional polar format having radial coordinates, angular coordinates and position values such that at every point in the array the radial coordinate is in proportionate relationship to the instantaneous frequency of the signal as transmitted, the angular coordinate is in proportionate relationship to the instantaneous angular position of the rotating scene, and the position value is in proportionate relationship to instantaneous value of the radar signal strength.

2. The method as defined in claim 1, wherein the scene is spatially imaged by coherent optical processing.

3. The method as defined in claim 1, wherein the coherent optical processing includes a Fourier transform of the recorded return signal data.

4. In a method of range-Doppler imaging a scene which is rotating about an axis of rotation relative to a sensor wherein return signal data are sequentially received, coherently demodulated and recorded on an optical recording medium preparatory to spatial imaging of the scene, the improvement which comprises:

recording transformed return signal data in polar format having radial and angular coordinates on the optical recording medium such that at every point on the recording medium an optical property of the medium is modulated in proportionate relationship to the instantaneous signal strength of the return signal, the radial coordinate is in proportionate relationship to the instantaneous frequency of the signal as transmitted, and the angular coordinate is in proportionate relationship to the instantaneous angular position of the rotating scene.

5. The method of range-Doppler imaging as defined in claim 4, wherein the optical property of the medium modulated in proportionate relationship with the signal strength is transmissivity.

6. The method of range-Doppler imaging as defined in claim 4, wherein the optical property of the medium modulated in proportionate relationship with the signal strength is reflectivity.

7. The method of range-Doppler imaging as defined in claim 4, wherein the optical recording medium is photo-sensitive film.

8. The method of range-Doppler imaging as defined in claim 7, wherein the return signal data are recorded on the photo-sensitive film by intensity modulating the incident line scan of a cathode ray tube in relation to the instantaneous strength of the return signal.

9. The method of range-Doppler imaging as defined in claim 8, wherein the photo-sensitive film is rotated in timed relation to the rotation rate of the scene about an axis of rotation substantially normal to the front surface of the cathode ray tube.

10. The method of range-Doppler imaging as defined in claim 4, wherein the return signal is sequentially received by a antenna having a line-of-sight defining an angle $\phi$ with respect to the axis of rotation of the scene such that compensation is made for $\phi$ in recording the return signal data by modulating the radial coordinate in relation with the instantaneous value of sin $\phi$.

11. The method of range-Doppler imaging as defined in claim 4, wherein the scene is spatially imaged by coherent optical processing.

12. The method of range-Doppler imaging as defined in claim 11, wherein the coherent optical processing includes a Fourier transform of the recorded radar signal data.

13. In a method of range-Doppler imaging a scene having rotation relative to a sensor over a predetermined range of angles, $\phi$, wherein return signal data are sequentially received, transformed and recorded on a photo-sensitive recording film preparatory to spatial imaging of the scene, the improvement which comprises:

wrapping the photo-sensitive recording film around the side periphery of a conic drum having an angle of convergence $\theta$ such that $\theta = 2 \arcsin (\phi/2\pi)$ and recording the return signal data on the film in a polar format with radial and angular coordinates such that at every point on the film an optical property of the film is modulated in proportionate relationship to the instantaneous signal strength of the radar signal, the radial coordinate is defined as the relative vertical position with respect to upper and lower surfaces of the conic drum and is in proportionate relationship to the instantaneous frequency of the transmitter signal, and the angular coordinate is defined as the relative angular position with respect to the conic axis and is in proportionate relationship to the instantaneous angular position of the rotating scene.

* * * * *